May 15, 1945.　　　　J. D. TESSIER　　　　2,375,876
　　　　　　　　　　BALING MACHINE
　　　　　　　Filed April 29, 1943　　　2 Sheets-Sheet 1
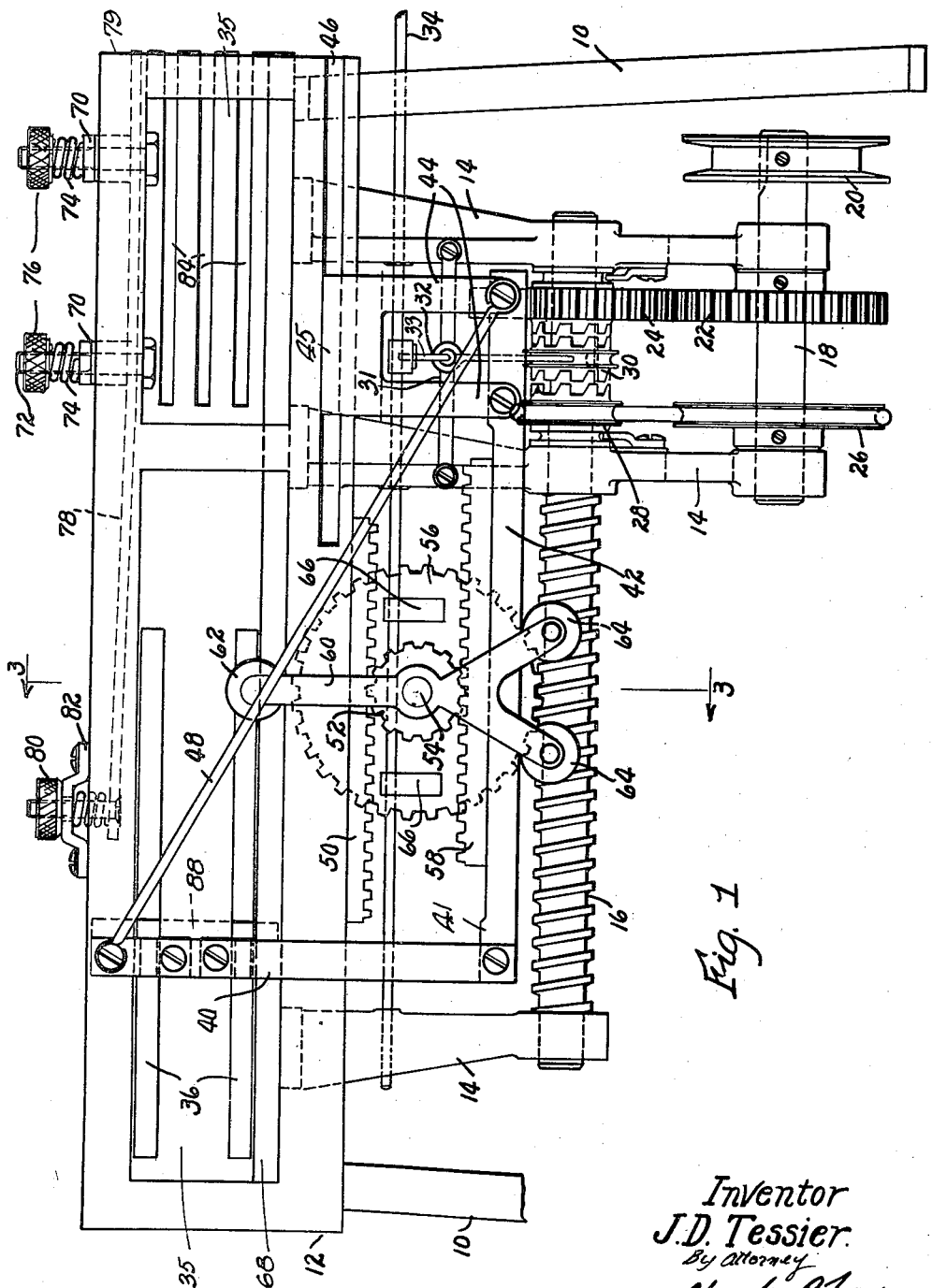
Inventor
J. D. Tessier.
By attorney
Charles R. Ray

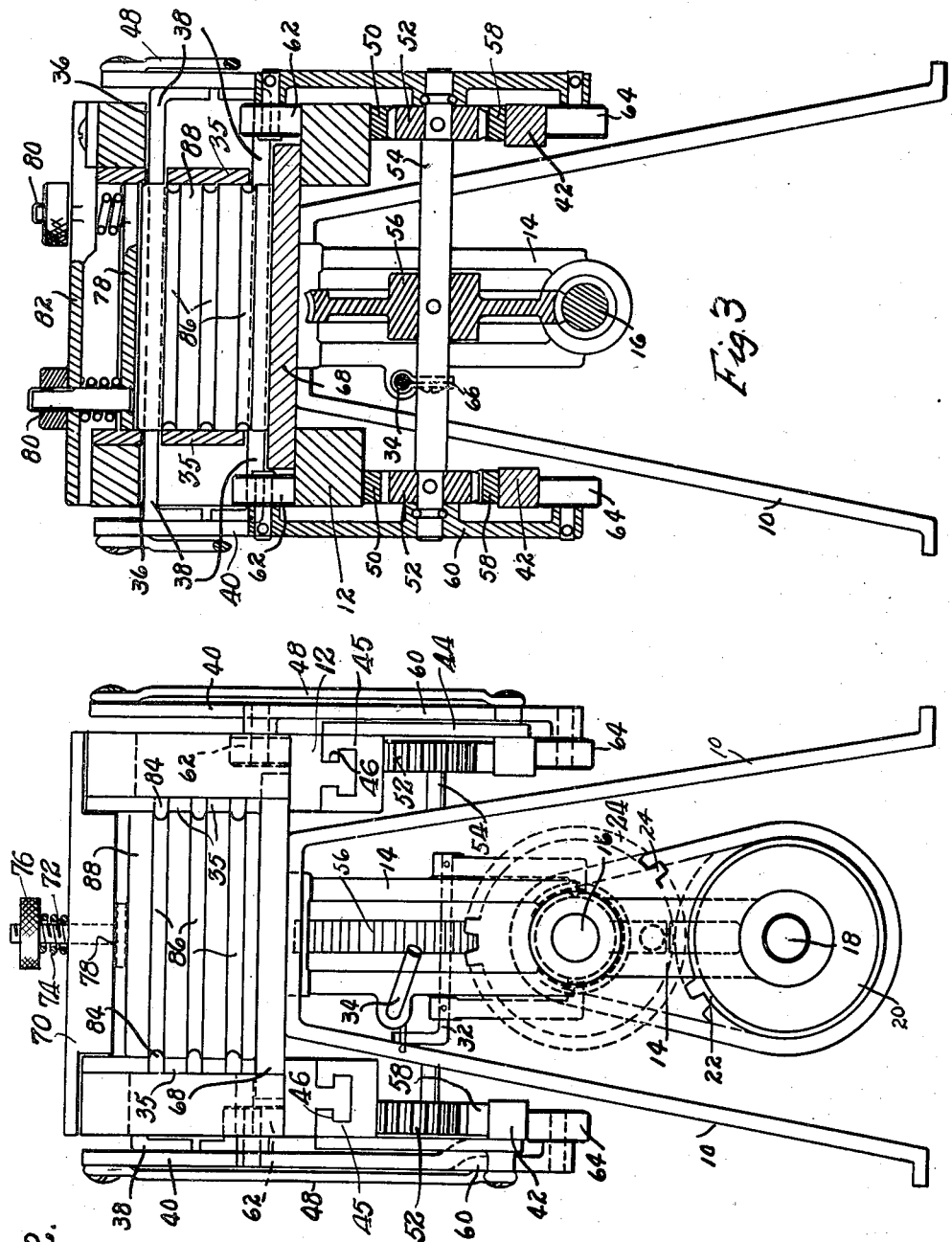

Patented May 15, 1945

2,375,876

UNITED STATES PATENT OFFICE 2,375,876

BALING MACHINE

Joseph D. Tessier, Worcester, Mass.

Application April 29, 1943, Serial No. 484,952

5 Claims. (Cl. 100—5)

This invention relates to baling machines and the objects of the invention include the provision of a baling machine having mechanism providing for a powerful pressure on the material to be baled, in combination with means providing for the continuous discharge of bales, by reason of the traveling of a completed bale under pressure exerted by the material in the process of baling, there being means resiliently opposing the passage of bales, said resilient means however being insufficient to overcome the baling pressure.

Further objects of the invention reside in the provision of a baling machine using a pair of fixed racks, these racks being located at opposite sides of the machine and cooperating with spur gears rotated by a worm wheel, in turn rotated by a worm shaft, said spur gears meshing with movable racks to travel the pressure member during the baling operation, the pressure member being maintained in a position wherein it cannot be twisted or otherwise rendered useless by reason of the spaced racks and gear construction, aided by special supporting members.

Other objects and advantages of the invention will appear hereinafter.

Reference is to be had to the accompanying drawings in which

Fig. 1 is a view in side elevation of a baling machine according to the invention;

Fig. 2 is a view in end elevation of the machine; and

Fig. 3 is a section on line 3—3 of Fig. 1.

A supporting frame of any desired construction is provided for the baling machine of the present invention, and this support is adapted to be set up on the ground or in a vehicle for convenient transportation thereof. The supporting frame comprises legs 10 which carry side frames as at 12 connected by an elongated floor member 68 and depending from the frame there are provided three supports 14 in which is journaled a main screw shaft 16.

Screw shaft 16 is mounted to rotate in a stationary position in the three depending brackets 14. As will be seen in Fig. 1, two of the brackets 14 depend below the screw shaft and journal a transverse stud shaft 18. Shaft 18 is provided with a pulley or the like means 20 for receiving power either from a stationary motor or from the motor of the vehicle on which the entire machine may be carried. Means is provided for forward and reverse rotation of screw shaft 16 from the stud shaft, and in the present instance this comprises a set for meshing gears 22, 24 and pulleys 26 and 28. Gear 22 and pulley 26 are fixed to shaft 18 whereas gear 24 and pulley 28 although mounted on the screw shaft 16, are loose thereon and are selectively made fast thereto by means of a clutch 30. The clutch 30 has a central element keyed to the screw shaft for rotation therewith and this element is axially slidable to selectively engage clutch elements fast on gear 24 and pulley 28. The central clutch element is shiftable by means of a link 32 which is connected by any convenient yoke and collar arrangement 33 to the central clutch element. Link 32 is pivoted at a convenient location to depending brackets 14 and is actuated by the longitudinal movement of a rod 34.

Side frames 12 are provided with a pair of elongated plates 35 having slots 36 at each side of the press for the sliding reception of arms 38 which extend across the machine and are slidable in unison the length of the slots 36. Arms 38 are connected by struts 40 which depend at each side of the machine as shown in Fig. 1 and at their lower ends struts 40 have struts 42 secured thereto which extend forwardly and connect with a pair of supports 44 which extend upwardly and have their top portions connected to a slide 45 having arms extending into a slot 46 in frame 12. It is to be understood that this construction is duplicated at the other side of the machine. A rod 48 extends from the top of strut 40 to the forwardmost extent of the strut 42 and thus it will be seen that the entire carriage just described is reciprocable on the machine; it is well supported at each end and is tied together in triangular form for additional strength and rigidity.

At each side of the machine there is provided a rack 50, both of these racks being fixed to frames 12 in the position shown in Fig. 1. Meshing with each rack is a spur gear 52, these spur gears being fixed to a cross shaft 54 in the center of which is fixedly mounted a large worm wheel 56 which meshes with screw shaft 16 for actuation and rotation thereby. A rack 58 is fixed to each strut 42 of the carriage and it will be seen that racks 50 and 58 oppose each other, and the rotation of the spur gears 52 derived from the travel of worm wheel 56 due to rotation of screw shaft 16 in either direction, forces reciprocal movement of the carriage in an increased degree, since the spur gears clearly walk along the fixed racks and in so doing, travel the movable racks in the same direction.

Cross shaft 54 is journaled at its ends in a pair of brackets 60, these brackets being provided with top wheels 62 riding on frames 12 and bottom wheels 64 riding on the undersides of the struts 42, thus supporting the carriage and locating cross shaft 54 and its gears. As thus far described it will be seen that there has been provided an efficient although relatively simple baling machine of high power in which the pressure member comprising arms 38, cannot become tilted or jammed in any way. The clutch may be manually positioned by rod 34 to run the carriage in either direction and means may be provided such as stops 66 on the rod actuated by shaft 54 to automatically shift the clutch at the end of either stroke.

The side frames 12 enclose a chute of which the side frames 12 constitute the sides, this chute having some means such as a member 68 forming the bottom. In the tops of the side members 12 I provide supports 70 through which pass pins 72 carrying depending springs 74 adjusted by means of nuts 76 which may be screw threaded on the pins. On supports 70 I mount a resilient pressure member 78 which is caused to bear down upon the contents of the chute to resist progress of baled material advancing therealong. The pressure member 78 is mounted at one end on a somewhat similar resilient device 80 mounted on a bracket 82 in such a way that the pressure member 78 inclines downwardly toward the exit end 79 of the chute. It will be seen that as each bale is formed, it will push the previously formed bale along the chute and against the pressure of the pressure member 78. Each bale will therefore in turn be caused to advance out of the machine at the forward or exit end thereof without the necessity of manually removing it.

At the forward end of the chute I provide a series of slots 84 in the side members 35 at each side of the machine and these slots register with grooves 86 in a spacer member 88 which is slidable along the chute and removable from the machine so as to be inserted between successive bales for separating the same. As each spacer member comes into the area of slots 84, wires may be passed through the latter, along grooves 86 in the spacer member and placed around the bale and tied while the bale is in the chute so that each bale is securely tied upon its exit from the chute.

It will be seen that the present invention provides an efficient powerful baling machine of relatively simple construction in which the material to be baled is deposited from above, behind, or to the left of pressure member 78 as seen in Fig. 1, and to the right of arms 38 secured to members 40, when the latter are in their leftwardmost position, each bale being separated from each of the others by the spacers 88, and each bale may be separately wired while in the chute of the machine by reason of slots 84 which permit the passage of the wires across the chute and guided by grooves 86 in the spacers. Each bale will push the previously formed bale out of the chute, and no manual removal of bales is necessary. The entire machine may be mounted stationarily or on a truck or the like and powered by the truck motor.

Having thus described my invention and the advantages thereof, I do not wish to be limited to the details herein disclosed, otherwise than as set forth in the claims, but what I claim is:

1. A baling machine comprising a support, means forming a chute on said support, a carriage reciprocable relative to said chute and having a part extending thereinto, a pair of spaced fixed racks on said support, a pair of racks on said carriage arranged in operative relation to said fixed racks, a gear meshing with each fixed and movable rack, a shaft connecting said gears, a worm wheel on the shaft and a screw shaft meshing with said worm wheel.

2. A baling machine comprising a support, means forming a chute on said support, a carriage reciprocable relative to said chute and having a part extending thereinto, a pair of spaced fixed racks on said support, a pair of racks on said carriage arranged in operative relation to said fixed racks, a gear meshing with each fixed and movable rack, a shaft connecting said gears, a worm wheel on the shaft and a screw shaft meshing with said worm wheel, a clutch on said screw shaft, a power shaft and means to drive said screw shaft in either direction from said power shaft through said clutch.

3. A baling machine comprising a support, means forming a chute on said support, a carriage reciprocable relative to said chute and having a part extending thereinto, a pair of spaced fixed racks on said support, a pair of racks on said carriage arranged in operative relation to said fixed racks, a gear meshing with each fixed and movable rack, a shaft connecting said gears, a worm wheel on the shaft, a screw shaft meshing with said worm wheel, and a cover for said chute, said cover being resiliently mounted to exert pressure upon material in said chute.

4. A baling machine comprising a support, means forming a chute on said support, a carriage movable along said chute, supporting brackets depending below said chute, a screw shaft journaled in said brackets, a worm wheel in mesh with said screw shaft and free to travel therealong during rotation thereof, a gear secured to said worm wheel, a rack fixed on said support, a rack secured to said carriage and movable therewith, said gear meshing with said racks.

5. A baling machine as recited in claim 1 including longitudinal slots in said chute, said carriage having two angularly related parts mounted for sliding movement in separate slots, said carriage supporting said gears.

JOSEPH D. TESSIER.